United States Patent [19]

Sommer

[11] 3,813,940
[45] June 4, 1974

[54] FLOW METER WITH A BYPASS
[75] Inventor: Donald W. Sommer, Troy, Mich.
[73] Assignee: Sperry Rand Corporation, Troy, Mich.
[22] Filed: Dec. 18, 1972
[21] Appl. No.: 316,183

[52] U.S. Cl. .................................. 73/198, 73/231 R
[51] Int. Cl. ............................................. G01f 1/10
[58] Field of Search ............ 73/229, 230, 231, 203, 73/197, 198; 137/513.3; 251/325

[56] References Cited
UNITED STATES PATENTS
2,646,041  7/1953  Gilroy et al. ..................... 137/513.3
3,352,155  11/1967  Penet ............................... 73/231 R
3,680,378  8/1972  Aurilio ............................. 73/231 R Primary Examiner—James J. Gill
Attorney, Agent, or Firm—Theodore Van Meter

[57]  ABSTRACT

A flow meter for measuring minute flow rates in a conduit which at times can carry very large flows has a valve in the conduit which opens to the large flow but when closed directs the minute flow through the interior of the valve. Inside the valve, a magnetic turbine responds to the minute flows and activates a magnetic pick-up located in a well in a wall of the conduit.

2 Claims, 3 Drawing Figures

PATENTED JUN 4 1974　　　　　　　　　　　　　　　3,813,940

FLOW METER WITH A BYPASS

In hydraulic power transmission systems and other systems dealing with the flow of fluids, it is frequently desirable to be able to measure the minute flows which take place in a conduit when it is not carrying its normally much larger rate of fluid flow. In this way, the small flow rates which occur because of leakage in shut-off valves, quiescent flow rates utilized for control purposes, etc. when capable of accurate measurement are reliable indications of overall system performance. However, existing flow meters suitable for measuring minute flows accurately are not capable of carrying the larger flows encountered in such conduits. Attempts to devise flow meters to meet both these requirements have been unsuccessful due either to rapid deterioration or to inaccuracy in measurement.

It is an object of the present invention to provide an improved flow meter which can measure minute flows accurately and can also carry very large flows but without measuring their rates. It is also an object to provide such a flow meter which is not subject to deterioration caused by exposure to flow rates beyond its normal capacity to measure.

These objects are achieved by the provision of a meter having a housing containing a tubular chamber with an inlet and an outlet, a well in a wall of the chamber for receiving an electric pick-up device, an elongated hollow valve member slidable in the chamber and spring biased toward closure against the flow of fluid through the chamber around the valve member, means forming a small passage for flow through the interior of the valve when thus closed, and a flow responsive electro-magnetic device carried inside the valve member in a position to activate the pick-up variably in accordance with the minute flow rates to be measured.

IN THE DRAWING

Figure 1:
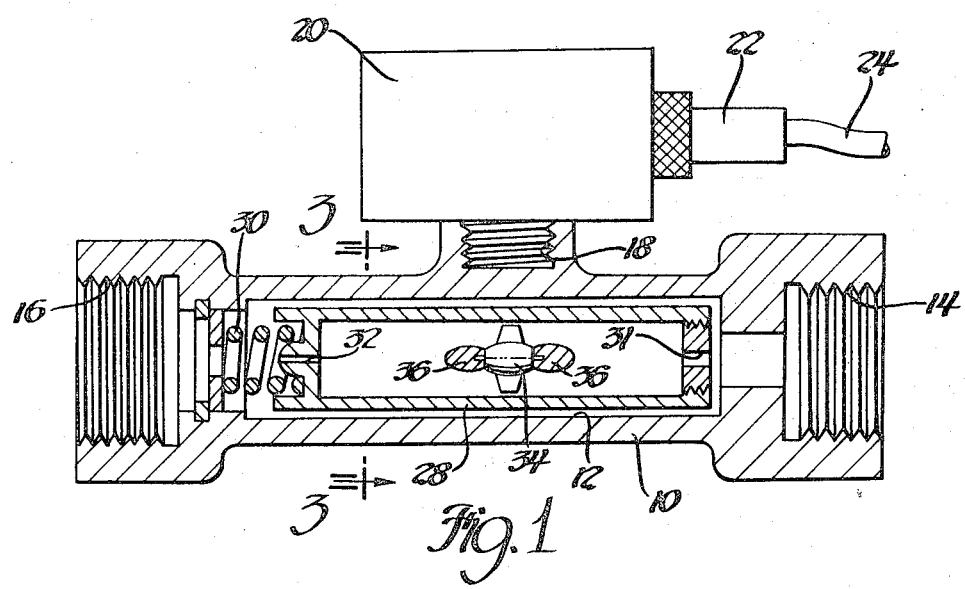
FIG. 1 is a longitudinal cross section of a flow meter incorporating a preferred form of the present invention.

Referring to FIG. 1, the flow meter there illustrated comprises a housing 10 having a tubular chamber 12 which connects with an inlet 14 and an outlet 16. In the top wall of the chamber 12 there is a well 18 which receives a magnetic pick-up device 20 having a terminal connection 22 from which a cable 24 leads to an indicator, not shown.

Figure 3:
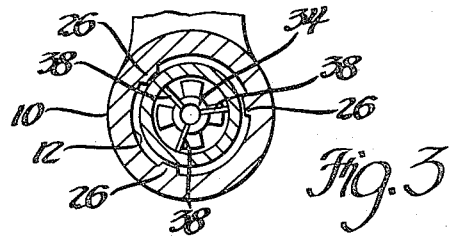
FIG. 3 is a cross sectional view on line 3—3 of FIG. 1.
Figure 2:
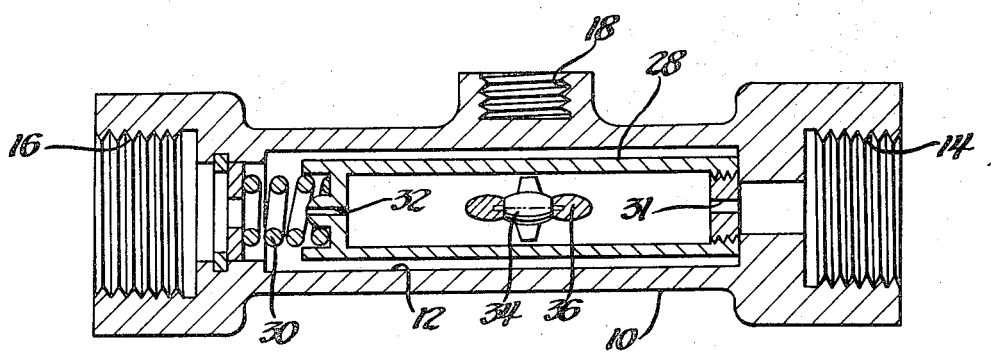
FIG. 2 is a view corresponding to FIG. 1 showing the parts in a different position.

Slidably positioned within the chamber 12 upon longitudinal ribs 26 (FIG. 3) is a hollow longitudinal valve member 28 which is biased toward the right by a spring 30. When in its seated position as shown in FIG. 2, flow around the outside of the valve is blocked. Under these conditions, minute flow rates are permitted through the interior of the valve 28 through a small inlet hole 31 and an exit hole 32.

Mounted inside the valve member 28 in a location aligned with the well 18 is a small turbine wheel 34 having blades of magnetic material. Suitable streamlined bearings 36 are positioned by struts 38 (FIG. 3) to provide a rotary support for the turbine 34.

In operation with the body 10 connected in series in a flow carrying conduit, whenever the normally large flow in the conduit is taking place, the valve member 28 is forced open against the spring 30 by this flow which then passes to the outlet 16 both around the outside of the valve and through the interior of the valve. Under such conditions, there is no flow rate measurement. When, however, the large flow is closed off through other means in the system, then the minute leakage or quiescent flow will be accurately measured because the valve 28 will take up the position shown in FIG. 2 and all of this minute flow will take place through the interior of the valve via inlet 31 and exit 32. Thus, the rate of rotation of the turbine 34 will be an index of the flow rate in the conduit. The pick-up 20 will respond variably in accordance with the variations of speed of the turbines 34 and this variation will be transmitted through the cable 24 to the indicating device, not shown.

I claim:

1. A flow meter for measuring minute flow rates in a conduit which, at times, can carry much larger flows comprising a housing having a tubular chamber with an inlet and an outlet, a well in a wall of the chamber for receiving an electric pick up device, an elongated hollow valve member slidable in the chamber and spring biased toward closure against the flow of fluid through the chamber around the valve member, means on the inlet end of the valve member forming a piston for automatically shifting the valve member at a predetermined pressure level, means forming a small passage for flow through the interior of the valve when closed, and a flow responsive electromagnetic device carried inside the valve member in a position to activate the pick-up variably in accordance with the minute flow rates to be measured.

2. A flow meter as defined in claim 1 wherein the electromagnetic device is a turbine having blades of magnetic material.

* * * * *